Patented Oct. 5, 1954

2,691,051

UNITED STATES PATENT OFFICE 2,691,051

MANUFACTURE OF BENZENE HEXACHLORIDE

Harold David Orloff and Calvin Joseph Worrel, Detroit, Mich., assignors to Ethyl Corporation, New York, N. Y., a corporation of Delaware No Drawing. Application November 18, 1950, Serial No. 196,518

2 Claims. (Cl. 260—648)

This invention relates to the manufacture of benzene hexachloride of improved effectiveness by reacting benzene and chlorine in the presence of selective additives which permit the addition chlorination of benzene to occur either in the presence of light or in the dark.

Benzene hexachloride is a well-known commercial insecticide. Crude benzene hexachloride contains a number of isomers of which only one, the so-called gamma isomer, exhibits any insecticidal activity. Furthermore, each of the benzene hexachloride isomers exhibit some toxicity to animals and stock, and it is desirable that the total dosage of benzene hexachloride employed at each application be as low as possible. Therefore, for a commercially acceptable insecticide comprising benzene hexachloride it is important that the gamma isomer content be as high as possible.

The present commercial process for the manufacture of benzene hexachloride comprises the additive chlorination of benzene in the presence of actinic light whereby a product containing about 12 per cent by weight of the gamma isomer is obtained. This product is either sold as a low grade product or the gamma content is concentrated by solvent extraction or crystallization. The gamma isomer is either sold at a premium or used to raise the gamma content of such low grade benzene hexachloride in order to increase the latter's market value, or in extreme cases to make low grade benzene hexachloride marketable. Thus, it is obvious that any process which will increase the gamma content is important.

It is customary in conducting the present commercial process to employ glass reactors, which greatly limits the heat transfer obtainable to moderate the exothermic reaction and places a practical limit upon the throughput capacity for a given size reactor. In addition, glass equipment has other disadvantages such as low service factor and high cost. Furthermore, because of the engineering problems involved, it is preferred to conduct the present light-catalyzed reaction at a low pressure and at a moderately low temperature, further restricting the production rate which it is possible to attain in such equipment.

It is, therefore, an object of our process to provide means for manufacturing benzene hexachloride of increased gamma isomer content. Another object of our invention is to provide means for manufacturing benzene hexachloride by the addition chlorination of benzene in the absence of light. It is a further object of our invention to permit the manufacture of benzene hexachloride in equipment which is adaptable to high pressure operation and high unit capacity.

The above objects are accomplished by the addition chlorination of benzene in the presence of organic bromides.

Our process is particularly advantageous as a continuous process, although if preferred a batch operation can be employed. In our process we prefer to maintain the product benzene hexachloride in solution in excess benzene, thus utilizing benzene both as reactant and as solvent medium. However, such a condition is not essential for the successful operation of our process and the chlorine to benzene feed ratio may be varied over wide limits. We prefer to establish reaction conditions such that substantially complete conversion of the chlorine is obtained. This may be achieved by controlling the ratios of organic bromide additive to the benzene feed, and chlorine to benzene feed, by increasing the temperature with or without the aid of increased pressure and by controlling the residence or contact time. If, however, it is desired to operate our process in such a fashion that the chlorine conversion is not complete in the "dark reaction," whereby maximum throughput capacity is achieved, it is possible to combine our process with the conventional light catalyzed process, wherein the last small portion of chlorine is reacted. Thus, our process is capable of wide variation and can be adjusted so as to obtain any desired throughput and product capacity. In contrast to the present light catalyzed process wherein high chlorine conversion and throughput capacity is obtained only at a sacrifice of the gamma isomer yield, we can obtain both high throughput capacity and high chlorine conversion without sacrificing gamma content.

Our process can be conducted over a wide temperature range, the practical limits being between about 5° C. and 125° C., although our preferred temperature of operation is in the range of 40 to 100° C. While our process can be operated satisfactorily at atmospheric pressure, it can also be operated at somewhat higher pressures for the reasons noted above. In a continuous operation the benzene to chlorine feed ratio is not critical and can be varied between the limits of 50 and 1200 parts by weight of benzene to 100 parts of chlorine, although we prefer to operate within the somewhat more narrow limits of 150 to 800 parts by weight of benzene to 100 parts of chlorine. The throughput capacity achieved in conducting the continuous embodiment of our process will, of course, vary with the size of the reaction vessel, the temperature of operation, the ratio of additive to benzene feed and the benzene to chlorine feed ratio. However, we prefer to operate our process by control of the benzene feed rate with respect to the reactor size such that we achieve a contact time of between 5 and 40 minutes, although equally good results can be obtained with a contact time as low as 1 minute and as high as 60 minutes.

The additives which can be employed in conducting the process of our invention comprise organic bromides wherein the organic radical is a hydrocarbon radical and is either aliphatic or aromatic. By aliphatic radicals we mean to include either saturated or unsaturated hydrocarbon groups. The unsaturated radicals can further be classified as alkenyl, allylic or vinylic. Specific examples of the saturated aliphatic bromides which can be employed to initiate the process of our invention include ethyl bromide, ethylene dibromide, isopropyl bromide, the amyl bromides, the octyl bromides, bromoform and ethylidene dibromide, all of which contain from 1 to 8 carbon atoms. As specific examples to illustrate the unsaturated bromides which can be employed in our process we include allyl bromide, vinyl bromide, propenyl bromide, crotyl bromide, methallyl bromide and cyclohexenyl bromide. Specific examples of the aryl bromides which we employ include bromobenzene, the dibromobenzenes, the bromotoluenes and the xylyl bromides. In general, the quantity of organic bromide employed in our process is not critical and can vary between about 1 part of bromide to 700 parts of benzene to 100 parts of organic bromide to 700 parts of benzene, although we prefer to employ amounts between about 1 and 10 parts of organic bromide to 150 parts of benzene, all parts being by weight.

The use of additives to initiate the addition chlorination of benzene is not practical where the additive is present in such quantity that contamination of the product will occur, or wherein the recovery of the product is complicated, or where it is impossible to readily remove the additive during the recovery of the product. For example, organic peroxides have heretofore been disclosed as initiators for the addition chlorination of benzene. Not only are such additives not as efficient as the organic bromides of our invention, but they also possess the further disadvantage that they impose such a recovery problem that they have no utility in a commercial operation. Thus, in concentrating the reaction mixture by evaporation to recover benzene hexachloride any such organic peroxide which has not been consumed during the reaction creates an explosion hazard, while the organic bromides of our invention can be readily recovered by simple distillation or can be recycled with the recovered benzene.

Our invention can be understood by referring to the following example describing one embodiment of a continuous process for the addition chlorination of benzene in the presence of one of our initiators. In this and the further examples, all parts and percentages are by weight.

*Example*

A continuous tubular reactor which excludes all light was provided with means for introducing a liquid benzene feed and a gaseous chlorine feed. The benzene feed to this reactor was previously mixed with ethyl bromide. A steady feed consisting of 393 parts per hour of benzene and 14.1 parts per hour of ethyl bromide was established. The chlorine flow was established at a steady rate of 90 parts per hour and introduced to the reactor flooded with the benzene-ethyl bromide feed. The tubular reactor was provided with a jacket for introducing a coolant and by this means the reaction temperature was maintained between the limits of 50 and 55° C. At this flow rate the contact time in the reactor was 18.4 minutes. The liquid reaction product passing from the reactor was introduced to a saturated solution of sodium sulfite wherein the small amount of unreacted chlorine was consumed immediately, thereby stopping the reaction. The resulting chlorine-free benzene solution of benzene hexachloride was separated and the benzene was removed by evaporation. The product benzene hexachloride was recovered as the residue from this operation. Under conditions of steady operation, the yield of benzene hexachloride was 90.3 parts per hour, equivalent to the conversion of 72.8 per cent of the chlorine to benzene hexachloride. The gamma isomer content of this product was 14.5 per cent, as determined by infrared analysis.

Under identical conditions of benzene and chlorine flow, contact time and temperature as in the foregoing example, we chlorinated benzene in the presence of benzoyl peroxide in place of the ethyl bromide of our invention. For this purpose we employed 1.6 parts per hour of benzoyl peroxide as catalyst which is the optimum quantity. The yield of benzene hexachloride was only 25.6 parts per hour, corresponding to a conversion of 22 per cent of the chlorine to benzene hexachloride. Thus, compared to an operation employing benzoyl peroxide at the optimum concentration, we obtained a 3.5-fold increase in chlorination rate by employing our ethyl bromide initiator.

Under identical conditions of temperature, contact time and flow, but substituting other organic bromides for the ethyl bromide of the foregoing example, we obtained the following results: with ethylene dibromide, at 25 parts per hour, we obtained 25 per cent conversion of chlorine to benzene hexachloride; with bromobenzene at 21 parts per hour, we obtained 18 per cent chlorine conversion; with allyl bromide at 16 parts per hour, we obtained 23 per cent chlorine conversion. Likewise when we employ isopropyl bromide, ethylidene dibromide or bromoform, we obtain similar results.

In the foregoing examples we do not infer that the optimum conditions were set for each bromide initiator. For each bromide there is a different set of conditions for optimum effectiveness. To illustrate this we followed the process described in the example, employing ethyl bromide, but varied the feed ratio of benzene to chlorine, maintaining the benzene to ethyl bromide ratio constant at 28 parts to 1 part, as follows: at benzene to chlorine feed ratios of 2 to 1, 4 to 1 and 8 to 1 we obtained chlorine conversions to benzene hexachloride of 65.7, 72.8 and 57.5 per cent, respectively, while the gamma isomer content of the product remained within the limits of 14.2 to 14.7 per cent.

Likewise, for each initiator, and under otherwise constant conditions, the conversion of chlorine to benzene hexachlorine will vary with the temperature of reaction. Thus, in a series of operations similar to the example in every respect except with regard to the temperature of reaction, we obtained the following results: at temperatures of 24° C., 37° C., 46° C., 57° C., and 74° C. the conversion of chlorine to benzene hexachloride was 5, 34, 65, 65 and 1.5 per cent respectively. The above results were obtained at atmospheric pressure. However, when we employ temperatures in the range of 80 to 125° C. we prefer to employ superatmospheric pressure, thereby maintaining the reactants in the liquid state, thus maintaining high conversions. Throughout the above temperature range the gamma isomer content of the product remained between the limits of 14.5 and 16 per cent. In contrast to this result, when such a variation in temperature of the photo-catalyzed or peroxide-catalyzed addition chlorination of benzene is employed in attempts to increase the rate of reaction and, therefore, the product capacity of the reactor system, the gamma isomer content of the product drops to approximately 4 to 10 per cent, at temperatures in the range of 75° C. to 80° C., for example.

We can conduct the process of our invention batch-wise as well as continuously. Thus, we charge a solution of benzene containing our organic bromide initiator to a vessel equipped with heat transfer means and means for introducing gaseous chlorine. Chlorine is admitted to this solution until any desired concentration of benzene hexachloride is produced. Thus, if addition is stopped while all the product is in solution, the solvent is evaporated until crystallization of the benzene hexachloride occurs, and the product is thereupon recovered by filtration. Likewise, chlorine addition can be continued until the product crystallizes in the reactor. Upon cooling this reaction mixture the benzene hexachloride can be directly recovered therefrom. In either procedure, we can alternatively remove all the benzene by evaporation and recover the residue which comprises essentially pure benzene hexachloride.

When conducting our process under conditions wherein complete chlorine conversion is not obtained, we can illuminate the reaction mixture subsequent to or concurrent with our process. Thereby, we obtain full advantage of the increased gamma isomer production obtainable by our process.

Various methods for recovering the benzene hexachloride product from our process can be employed. For example, when the conditions of reaction are such that the benzene hexachloride remains in solution, we can concentrate this solution by evaporation or flash vaporization to such a concentration that the benzene hexachloride separates as a crystalline solid, and is thereupon recovered by filtration. Also we can remove substantially all the unreacted benzene by evaporation, and recover a molten benzene hexachloride product which is thereupon cooled by drum casting or other means and the solidified product is recovered and ground to a condition suitable for formulation or further processing, such as, for example, to further concentrate the gamma isomer. These various methods apply equally to batch, semi-continuous or continuous embodiments of our process.

The organic bromide additive of our invention can be either recovered, as by evaporation, extraction or preferential crystallization, or can be returned to the reaction system as recycle, depending on the economic value of each procedure, the physical properties of such additive, the conditions of reaction and the type of process, that is whether continuous, semi-continuous or batch.

Having thus described our process, and as many variations thereof will be apparent to those skilled in this art, we do not intend that our invention be limited other than by the appended claims.

We claim:

1. A process for the manufacture of benzene hexachloride having a high concentration of the gamma isomer comprising reacting benzene with chlorine in the dark at a temperature of above 5° C. and in the presence of between about 1 and 10 parts by weight of a saturated aliphatic bromide containing from 1 to 8 carbon atoms as the sole reaction initiator to 150 parts by weight of benzene.

2. The process of claim 1 wherein the aliphatic bromide is selected from the group consisting of ethyl bromide, ethylene dibromide, isopropyl bromide, the amyl bromides, the octyl bromides, ethylidene dibromide and bromoform.

References Cited in the file of this patent

UNITED STATES PATENTS

| Number | Name | Date |
| --- | --- | --- |
| 2,628,260 | Britton | Feb. 10, 1953 |

FOREIGN PATENTS

| Number | Country | Date |
| --- | --- | --- |
| 471,772 | Belgium | Apr. 14, 1947 |
| 973,774 | France | Sept. 20, 1950 |